(No Model.)
F. S. REAGER.
REEL SUPPORT.
No. 483,389. Patented Sept. 27, 1892.
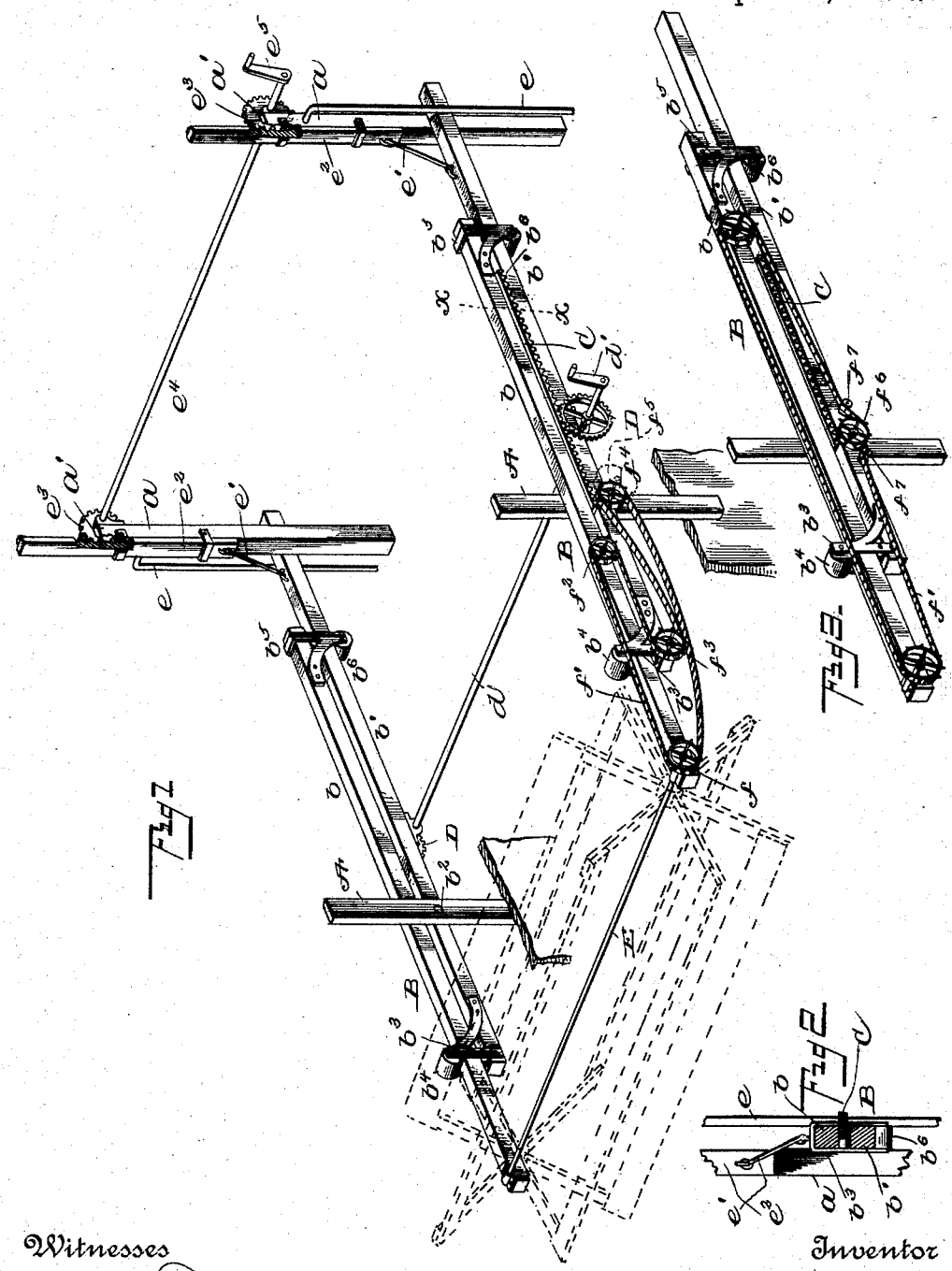
Witnesses
Inventor

UNITED STATES PATENT OFFICE.

FRANK SEYMOUR REAGER, OF GERMANTOWN, CALIFORNIA.

REEL-SUPPORT.

SPECIFICATION forming part of Letters Patent No. 483,389, dated September 27, 1892.

Application filed January 18, 1892. Serial No. 418,498. (No model.)

*To all whom it may concern:*

Be it known that I, FRANK SEYMOUR REAGER, of Germantown, in the county of Glenn and State of California, have invented certain new and useful Improvements in Reel-Supports; and I do hereby declare the following to be a full, clear, and exact description of the invention, such as will enable others skilled in the art to which it appertains to make and use the same.

This invention relates to a new and improved reel-support for harvesters; and it has for its object the provision of simple and highly-efficient means whereby the reel can be adjusted and held at any desired altitude, according to the height of the grain being operated upon.

The invention comprises two parallel reel-supporting arms which are capable of being adjusted back and forward and tilted so as to effect the raising and lowering of the reel, which is mounted on the outer ends of said supporting-arms.

The invention further comprises two parallel reel-supports composed each of two arms or members adjustable with relation to each other, sprocket-wheels on one set of said arms or members, and a sprocket-chain engaging all of said sprocket-wheels, whereby the outer arms or members can be adjusted without interfering with the working of said sprocket chain and wheels.

The invention further comprises the detail construction, combination, and arrangement of parts, substantially as hereinafter fully set forth, and particularly pointed out in the claim.

In the accompanying drawings, Figure 1 is a view in perspective illustrating my invention. Fig. 2 is a vertical cross-sectional view on the line $x\,x$, Fig. 1. Fig. 3 is a view of a modification.

Referring to the drawings, A designates two vertical posts, which at their lower ends are secured to the header of a harvesting-machine, (not shown,) and $a$ two more posts, likewise secured and having slots $a'$ extending from their upper ends downwardly a short distance.

B B designate the reel-supports, which comprise each two arms or members $b\,b'$. The lower arms or members $b'$ are pivotally mounted at $b^2$ on posts A, while the arms or members $b$ are fitted on said arms or members $b'$ and held each in relation to the other by a bracket $b^3$, projecting from arm $b'$ and having a frictional roll $b^4$, and a bracket $b^5$, projecting from arm $b$ and having a similar roll $b^6$. To the under side of each arm or member $b$ is secured a rack-bar C, which protrudes slightly beyond the side of said arm. With these rack-bars engage gear-wheels D D, mounted on a shaft $d$, supported by boxing attached to the under side of arms or members $b'$. One end of shaft $d$ has a crank-handle $d'$, by which the gear-wheels can be operated, said crank-handle being under the control of the driver or operator. The rear ends of arms or members $b'$ are held against posts $a$ by guide-braces $e$, which at their upper angular ends are rigidly secured to post $a$. To these arms or members $b'$ are connected by means of short rods $e'$ movable rack-bars $e^2$, which are held to posts $a$ by clamps. With the teeth of these rack-bars are designed to engage gear-wheels $e^3$ on a shaft $e^4$, supported by posts $a$, said gear-wheels being projected through slots $a'$, formed in said posts. One end of this shaft has a crank-handle $e^5$, which is under the control of the operator.

E is the reel-supporting shaft, mounted on the outer ends of arms $b$. Upon one end of this shaft is a sprocket-wheel $f$, around which is passed a sprocket-chain $f'$. This chain is also passed around a sprocket-wheel $f^2$, mounted on arm or member $b$, and then around a third sprocket-wheel $f^3$ on the outer end of arm or member $b'$, and thence over and around a fourth sprocket-wheel $f^4$, also mounted on arm or member $b'$. Upon the shaft of this latter sprocket-wheel $f^4$ is a pulley $f^5$, around which a driving-belt (not shown) is passed. By this arrangement of sprocket-wheels the arms or members $b$ can be adjusted to any desired extent without interfering with the working of said parts, motion being continuously imparted to the reel-shaft.

In Fig. 3 I have shown a slight modification of this arrangement of sprocket-wheels and chain. In lieu of attaching two sprocket-wheels to arm or member $b'$, I employ a sprocket-wheel $f^6$, and on each side thereof locate a roller $f^7$, which rollers hold chain $f'$ up against said sprocket-wheel. This arrangement likewise permits of the adjustment of the arms or members without interfering with the working of the reel-operating mechanism.

From what has been said it will be seen that by turning crank-shaft $d$ the arms or members $b$ can be adjusted to any desired point, and that by turning shaft $e^4$ the arms or members can be raised or lowered, according to the attitude it is desired the reel should occupy, the same being regulated by the height of the grain.

The advantages of my invention are apparent to those skilled in the art to which it appertains, and it will be especially observed that a reel-support so constructed is extremely simple, inexpensive, can be readily adjusted, and is strong and durable.

I claim as my invention—

The herein-described improved reel-support, comprising the post A, the supporting-arms embracing two arms or members, the lower arms or members being pivoted on said post, the rack-bars secured to the upper arms or members, the gear-wheels engaging therewith, the reel-shaft mounted on the outer ends of said upper arms or members and having a sprocket-wheel on one end, the sprocket-wheel $f^2$, mounted on said upper arm or member, the two sprocket-wheels mounted on said lower arm or member, and the chain engaging or encompassing said sprocket-wheels, substantially as set forth.

In testimony whereof I have signed this specification in the presence of two subscribing witnesses.

FRANK SEYMOUR REAGER.

Witnesses:
 FRED DEHLE,
 M. GOLDEN.